United States Patent
Childress et al.

(10) Patent No.: US 10,548,011 B2
(45) Date of Patent: *Jan. 28, 2020

(54) CHALLENGE-RESPONSE AUTHENTICATION BASED ON INTERNET OF THINGS INFORMATION

(71) Applicant: International Business Machines Corporation, Armonk, NY (US)

(72) Inventors: Rhonda L. Childress, Austin, TX (US); Itzhack Goldberg, Hadera (IL); Boaz Mizrachi, Haifa (IL); Clifford A. Pickover, Yorktown Heights, NY (US); Neil Sondhi, Budapest (HU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/198,061

(22) Filed: Nov. 21, 2018

(65) Prior Publication Data

US 2019/0098501 A1     Mar. 28, 2019

Related U.S. Application Data

(63) Continuation of application No. 14/696,797, filed on Apr. 27, 2015, now Pat. No. 10,231,122.

(51) Int. Cl.
*H04W 12/06*     (2009.01)
*H04L 29/06*     (2006.01)
(Continued)

(52) U.S. Cl.
CPC ......... *H04W 12/06* (2013.01); *H04L 63/0853* (2013.01); *G06F 21/316* (2013.01); *H04L 63/08* (2013.01); *H04L 67/12* (2013.01)

(58) Field of Classification Search
CPC ....... H04B 13/005; H04L 63/08; G06Q 20/32
(Continued)

(56) References Cited

U.S. PATENT DOCUMENTS 6,334,121 B1   12/2001   Primeaux et al.
6,954,862 B2   10/2005   Serpa
(Continued)

FOREIGN PATENT DOCUMENTS

CA     2530944 A1   11/2005
EP     1743447 A1    1/2007
(Continued)

OTHER PUBLICATIONS

Rouse, M, "Knowledge-based authentication (KBA)", Tech Target, Feb. 2009, 5 pages.
(Continued)

*Primary Examiner* — Bryan F Wright
(74) *Attorney, Agent, or Firm* — William H. Hartwell; Madeline F. Schiesser; Keohane & D'Alessandro PLLC

(57) ABSTRACT

Approaches presented herein enable challenge-response authentication of a user based on information captured by a personal internet of things (IoT) device set associated with the user. Specifically, in one approach, a personal IoT device set comprising at least one device records and stores data associated with a user. The data is synchronized and stored to a computerized authentication system, which prompts the user with an authentication question based on the synchronized and stored data. The user may find an answer to the authentication question by reviewing data recorded and stored in the device of the personal IoT device set. The user may then enter the found answer to the authentication question, thereby authenticating the user. The personal IoT device set may comprise a single device or may comprise a plurality of devices, the information of one of which may be selected as the basis of the authentication question.

20 Claims, 5 Drawing Sheets

(51) Int. Cl.
*G06F 21/31* (2013.01)
*H04L 29/08* (2006.01)

(58) Field of Classification Search
USPC .......................................................... 726/23
See application file for complete search history.

(56) References Cited

U.S. PATENT DOCUMENTS

| | | | |
|---|---|---|---|
| 7,430,758 B2 | 9/2008 | Toutonghi | |
| 7,587,446 B1 | 9/2009 | Onyon et al. | |
| 7,594,121 B2 | 9/2009 | Eytchison et al. | |
| 7,603,556 B2 | 10/2009 | Brown et al. | |
| 7,664,961 B2 | 2/2010 | Blattner et al. | |
| 7,676,433 B1* | 3/2010 | Ross | G06Q 20/02 705/37 |
| 8,176,159 B2 | 5/2012 | Kashi | |
| 8,260,262 B2 | 9/2012 | Ben Ayed | |
| 8,364,120 B2 | 1/2013 | Kuhlman et al. | |
| 8,433,919 B2 | 4/2013 | Giobbi et al. | |
| 8,494,961 B1 | 7/2013 | Lucas et al. | |
| 8,621,209 B1 | 12/2013 | Johansson et al. | |
| 8,850,537 B1* | 9/2014 | Dotan | H04L 63/08 726/6 |
| 8,955,058 B2 | 2/2015 | Castro et al. | |
| 9,009,844 B1* | 4/2015 | Corn | H04L 9/3271 726/27 |
| 9,667,611 B1* | 5/2017 | Friedman | H04L 63/08 |
| 2008/0066165 A1 | 3/2008 | Rosenoer | |
| 2009/0305667 A1* | 12/2009 | Schultz | H04L 63/08 455/410 |
| 2009/0305670 A1* | 12/2009 | DeBoer | G06Q 20/32 455/411 |
| 2013/0055348 A1 | 2/2013 | Strauss et al. | |
| 2013/0133055 A1 | 5/2013 | Ali et al. | |
| 2014/0244710 A1 | 8/2014 | Sharma et al. | |
| 2014/0244834 A1 | 8/2014 | Guedalia et al. | |
| 2015/0120317 A1 | 4/2015 | Mayou et al. | |
| 2015/0216413 A1 | 8/2015 | Soyao et al. | |
| 2015/0244699 A1 | 8/2015 | Hessler | |
| 2015/0310195 A1 | 10/2015 | Bailor et al. | |
| 2016/0211925 A1* | 7/2016 | Sydir | H04B 13/005 |
| 2016/0315929 A1 | 10/2016 | Childress et al. | |

FOREIGN PATENT DOCUMENTS

| | | |
|---|---|---|
| WO | 2004021108 A2 | 3/2004 |
| WO | 2005078548 A2 | 8/2005 |

OTHER PUBLICATIONS

Gaudin, S., "Bionym's wearable authentication device ships to developers", IT World, Oct. 14, 2014, 5 pages.
Dubin, J., "Are knowledge-based authentication systems doing more harm than good?", Tech Target, Apr. 2007, 6 pages.
Westervelt, R., "Knowledge-based authentication poses privacy issues", Tech Target, Mar. 2010, 5 pages.
Kumar, A., "Two-factor authentication options, use cases and best practices", Tech Target, Jul. 2013, 7 pages.
Good Security Questions, http://goodsecurityquestions.com/, Copyright 2007-2015 Kwista LLC, 2 pages.
Robert Westervelt, "Knowledge-based authentication treads lightly on privacy issues", Tech Target, Feb. 10, 2010, 8 pages.
Bryan F. Wright, USPTO Office Action, U.S. Appl. No. 14/696,797, dated Aug. 17, 2016, 20 pages.
Bryan F. Wright, USPTO Final Office Action, U.S. Appl. No. 14/696,797, dated Feb. 7, 2017, 18 pages.
Bryan F. Wright, USPTO Office Action, U.S. Appl. No. 14/696,797, dated May 30, 2017, 17 pages.
Bryan F. Wright, USPTO Final Office Action, U.S. Appl. No. 14/696,797, dated Nov. 1, 2017, 18 pages.
Bryan F. Wright, USPTO Office Action, U.S. Appl. No. 14/696,797, dated Apr. 4, 2018, 14 pages.
Bryan F. Wright, USPTO Notice of Allowance and Fee(s) Due, U.S. Appl. No. 14/696,797, dated Oct. 16, 2018, 9 pages.

* cited by examiner

CHALLENGE-RESPONSE AUTHENTICATION BASED ON INTERNET OF THINGS INFORMATION

CROSS-REFERENCE TO RELATED APPLICATIONS

The present patent document is a continuation of U.S. patent application Ser. No. 14/696,797, filed Apr. 27, 2015, entitled "CHALLENGE-RESPONSE AUTHENTICATION BASED ON INTERNET OF THINGS INFORMATION", the disclosure of which is incorporated herein by reference.

TECHNICAL FIELD

This invention relates generally to user authentication and more specifically, to knowledge-based challenge-response authentication based on information captured by an internet of things (IoT) device set.

BACKGROUND

Authentication of a user in an electronic environment (e.g., an internet log-on) is typically accomplished by one or more challenge and response questions. For example, a user may be authenticated by entering a username and pre-set password. As a heightened security measure, or in response to a forgotten password, some authentication systems may prompt a user with a second authentication step, such as a user defined challenge question, and/or may send an authentication code to a pre-designated device of the user which the user enters into the prompt. Typically, these challenge questions are based on personal information about the user, such as, "What is your grandmother's maiden name?", "What was the make of your first car?", or "What is your favorite ice cream flavor?"

SUMMARY

In general, embodiments described herein provide challenge-response authentication of a user based on information captured by a personal internet of things (IoT) device set associated with the user. Specifically, in one approach, a personal IoT device set comprising at least one device records and stores data associated with a user. The data is synchronized and stored to a computerized authentication system, which prompts the user with an authentication question based on the synchronized and stored data. The user may find an answer to the authentication question by reviewing data recorded and stored in the device of the personal IoT device set. The user may then enter the found answer to the authentication question, thereby authenticating the user. The personal IoT device set may comprise a single device or may comprise a plurality of devices, the information of one of which may be selected as the basis of the authentication question.

One aspect of the present invention includes a computer-implemented method for authenticating a user, the method comprising: identifying an internet of things device set identified with a user, the internet of things device set tracking information of the user over a period of time; receiving a request to authenticate the user and a designation of at least one device of the internet of things device set as available to the user; determining an authentication question based on the information of the user and the at least one device designated as available to the user, a correct answer to the authentication question corresponding to a data point tracked with the internet of things device set; prompting the user with the authentication question; and authenticating the user in the case that the user returns the correct answer to the authentication question.

Another aspect of the present invention includes a computer system for authenticating a user, the computer system comprising: a memory medium comprising program instructions; a bus coupled to the memory medium; and a processor, for executing the program instructions, coupled to a challenge-response authentication tool via the bus that when executing the program instructions causes the system to: identify an internet of things device set identified with a user, the internet of things device set tracking information of the user over a period of time; receive a request to authenticate the user and a designation of at least one device of the internet of things device set as available to the user; determine an authentication question based on the information of the user and the at least one device designated as available to the user, a correct answer to the authentication question corresponding to a data point tracked with the internet of things device set; prompt the user with the authentication question; and authenticate the user in the case that the user returns the correct answer to the authentication question.

Yet another aspect of the present invention includes a computer program product for authenticating a user, the computer program product comprising a computer readable storage device, and program instructions stored on the computer readable storage device, to: identify an internet of things device set identified with a user, the internet of things device set tracking information of the user over a period of time; receive a request to authenticate the user and a designation of at least one device of the internet of things device set as available to the user; determine an authentication question based on the information of the user and the at least one device designated as available to the user, a correct answer to the authentication question corresponding to a data point tracked with the internet of things device set; prompt the user with the authentication question; and authenticate the user in the case that the user returns the correct answer to the authentication question.

Yet still another aspect of the present invention includes a method for deploying a system for authenticating a user, comprising: providing a computer infrastructure that includes at least one computer device that operates to perform the steps of: identifying an internet of things device set identified with a user, the internet of things device set tracking information of the user over a period of time; receiving a request to authenticate the user and a designation of at least one device of the internet of things device set as available to the user; determining an authentication question based on the information of the user and the at least one device designated as available to the user, a correct answer to the authentication question corresponding to a data point tracked with the internet of things device set; prompting the user with the authentication question; and authenticating the user in the case that the user returns the correct answer to the authentication question.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
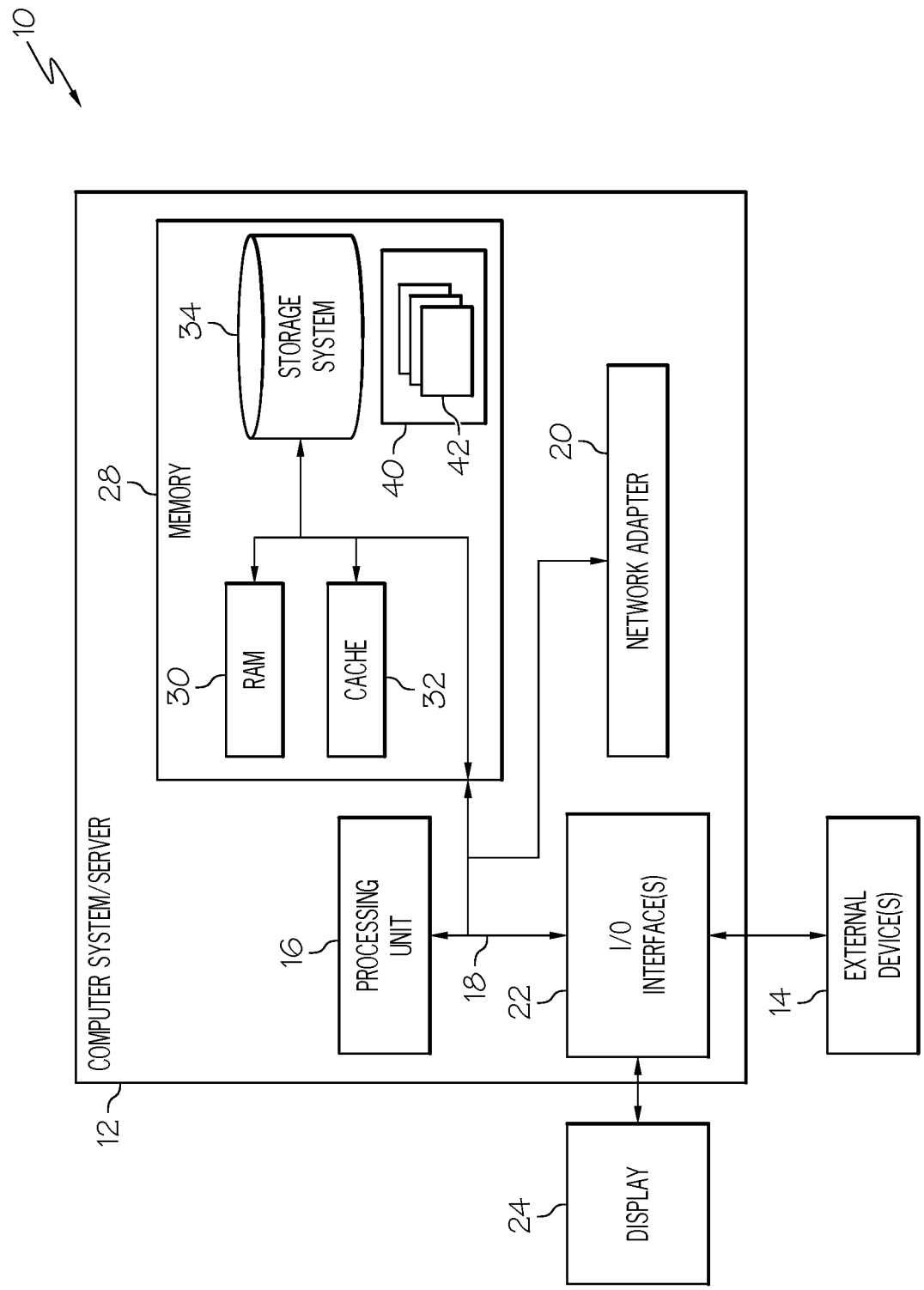
FIG. 1 shows an architecture in which the invention may be implemented according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As stated above, embodiments described herein provide challenge-response authentication of a user based on information captured by a personal internet of things (IoT) device set associated with the user. Specifically, in one approach, a personal IoT device set comprising at least one device records and stores data associated with a user. The data is synchronized and stored to a computerized authentication system, which prompts the user with an authentication question based on the synchronized and stored data. The user may find an answer to the authentication question by reviewing data recorded and stored in the device of the personal IoT device set. The user may then enter the found answer to the authentication question, thereby authenticating the user. The personal IoT device set may comprise a single device or may comprise a plurality of devices, the information of one of which may be selected as the basis of the authentication question.

Embodiments of the present invention address several deficiencies of current methods of user authentication. For example, a user may set a login name and password, as well as a challenge question in the case that the password is forgotten. Challenge questions generally allow a user to reset or retrieve his/her password or act as a secondary level of authentication. Challenge questions typically involve personal information about the user such as a name of a family member, a favorite food or thing, or an important event. However, users may easily forget the answers to these challenge questions, particularly if personal memories have faded with time and/or personal preferences have changed.

An attacker may take advantage the large amount of data available about a person online to discover the answer to this challenge question. For example, a name of a family member, place of birth, or high school, may be discovered from public records. Tastes, preferences, and other favorite things may be determined from social media and other data a user shares online. An attacker may also steal a personal device of a user, providing the attacker with access to authentication codes and passwords.

Attempts have been made to increase authentication security, such as by two-step authentication, where a code is sent to a pre-selected device of a user after a user enters his password. However, this form of security may be foiled by an attacker who steals the selected device, or merely by a user who misplaces his device. Sometimes an attacker may foil two-step authentication security measures altogether by indicating that a device is missing, promoting the challenge question to be offered instead. The attacker who has researched the user may successfully discover the answer to the challenge question and gain illicit access.

Accordingly, some approaches described herein may contain numerous advantages over present methods including, but not limited to, increasing user authentication security by basing the authentication on "trivial" data gathered by a personal internet device of things set associated with the user.

Referring now to FIG. 1, a computerized implementation 10 of an embodiment for authenticating a user will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system 12 is intended to demonstrate that some or all of the components of implementation 10 could be deployed, managed, serviced, etc., by a service provider who offers to implement, deploy, and/or perform the functions of the present invention for others.

Computer system 12 is intended to represent any type of computer system that may be implemented in deploying/realizing the teachings recited herein. Computer system 12 may be described in the general context of computer system executable instructions, such as program modules, being executed by a computer system. Generally, program modules may include routines, programs, objects, components, logic, data structures, and so on, that perform particular tasks or implement particular abstract data types. In this particular example, computer system 12 represents an illustrative system for authenticating a user. It should be understood that any other computers implemented under the present invention may have different components/software, but can perform similar functions.

Computer system 12 in computerized implementation 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for authenticating a user, which is stored in memory 28, storage system 34, and/or program/utility 40. While executing computer program code, processing unit 16 can read and/or write data to/from memory 28, storage system 34, and program/utility 40.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/ server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
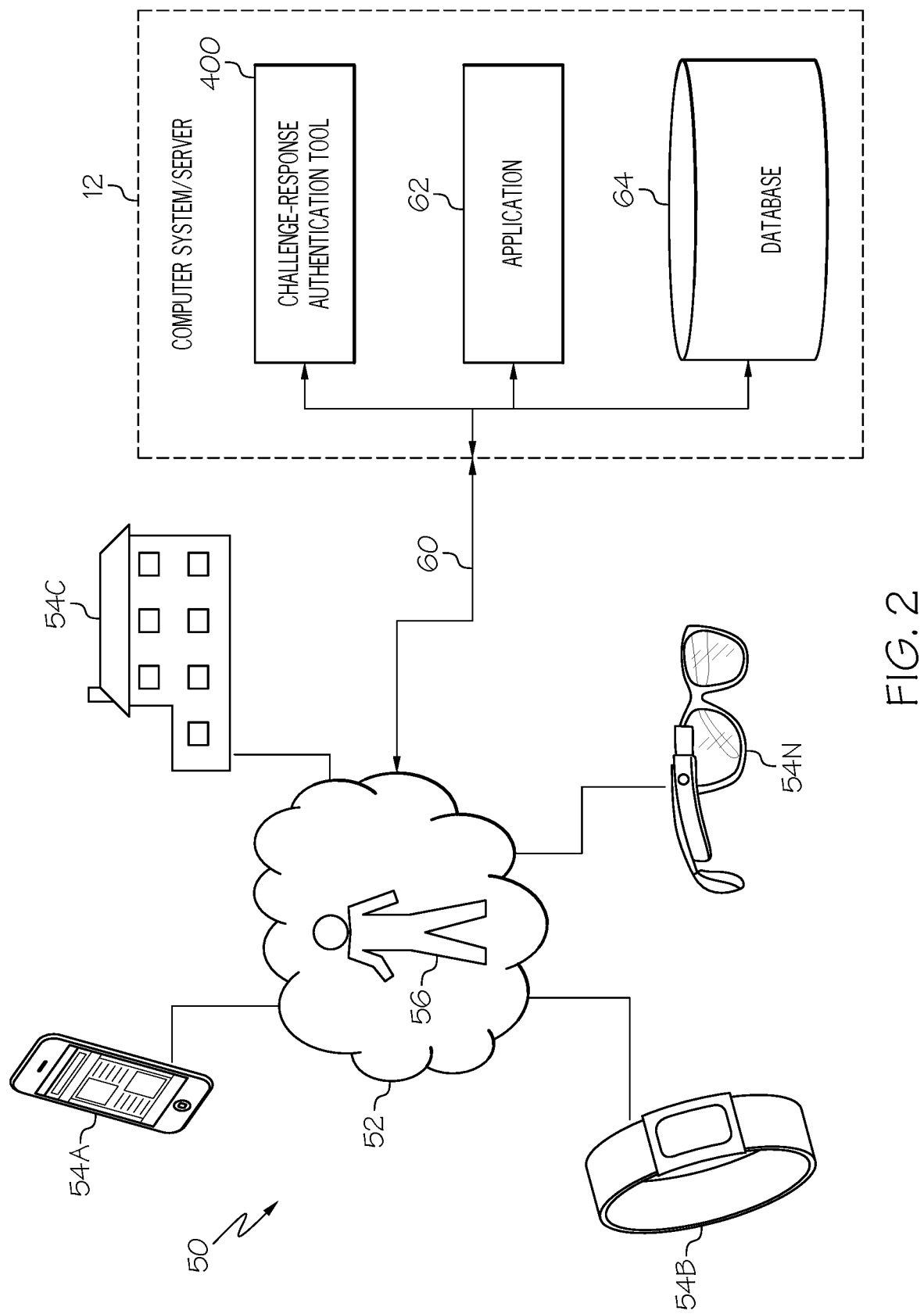
FIG. 2 shows an illustrative internet of things device environment according to illustrative embodiments.

Referring now to FIG. 2, an illustrative personal internet of things (IoT) device environment 50 is depicted. Personal IoT environment 50 comprises personal internet of things (IoT) device set 52. Personal IoT device set 52 may comprise one or more ambient devices, electronic recorders, personal electronics, consumables, wearables, and the like (such as devices 54A-N associated with user 56). Devices 54A-N may include, for example, personal digital assistant (PDA) or cellular telephone 54A, personal metric wearable device 54B (e.g., a Fitbit device, a Gear Fit device (Fitbit is a registered trademark of Fitbit Inc., Gear Fit is a trademark of Samsung, Inc.)), an object associated with smart information 54C (e.g., a smart home computer system), and/or other electronics 54N (e.g., a smart watch, smart jewelry, Google Glass, a smart wallet, a smart shirt, etc. (Google Glass is a registered trademark of Google Inc.)). It is understood that the types of devices 54A-N shown in FIG. 2 are intended to be illustrative only. It should also be understood that devices 54A-N of personal IoT device set 52 can communicate with various types of computerized systems and/or servers 12 over any type of network and/or network addressable connection 60, such as a PAN, WSAN, WLAN, or WAN, hardwired connection, and/or the like.

Computerized system/server 12 may comprise, for example, application 62 to receive and administer data received from devices 54A-N of personal IoT device set 52. Computerized system/server 12 may further comprise database 64 to store data received from devices 54A-N of personal IoT device set 52. Computerized system/server 12 may also comprise challenge-response authentication tool 400 for carrying out certain embodiments of the invention. In some embodiments, application 62, database 64, and challenge-response authentication tool 400 may be located across one or more servers or computerized systems. In some embodiments, one or more of application 62, database 64, or challenge-response authentication tool 400 may be located in a cloud computing environment. In one embodiment, application 62 and challenge-response authentication tool 400 may be implemented as one or more program modules 42, and database 64 may be implemented as storage system 34 shown in FIG. 1.

Devices 54A-N may track, record, and/or store personal data associated with user 56. Tracked personal data associated with user 56 includes, but is not limited to, data monitored by devices 54A-N that describe any activity, event, condition, or situation of user 56. This tracked personal data may also be monitored to show dynamic changes over a period of time.

For example, user 56 may wear personal metric device 54B and set personal metric device 54B to record the user's duration and/or quality of sleep, number of steps taken in a day, heart rate throughout a day, locations, speed, and the like. In another example, a user may use a camera device to take and store a digital photograph. Personal data recorded by one of devices 54A-N may be uploaded to computerized system/server 12. For example, computer system server 12 may receive personal data by: a user manually prompting an upload of data; devices 54A-N synchronizing/pushing data to computerized system/server 12 at an interval or in real-time; or computerized system/server 12 pulling data from devices 54A-N at an interval, in real-time, or as needed. This data may be administered at application 62 (e.g., tagged, formatted) and/or stored in database 64.

Figure 3:
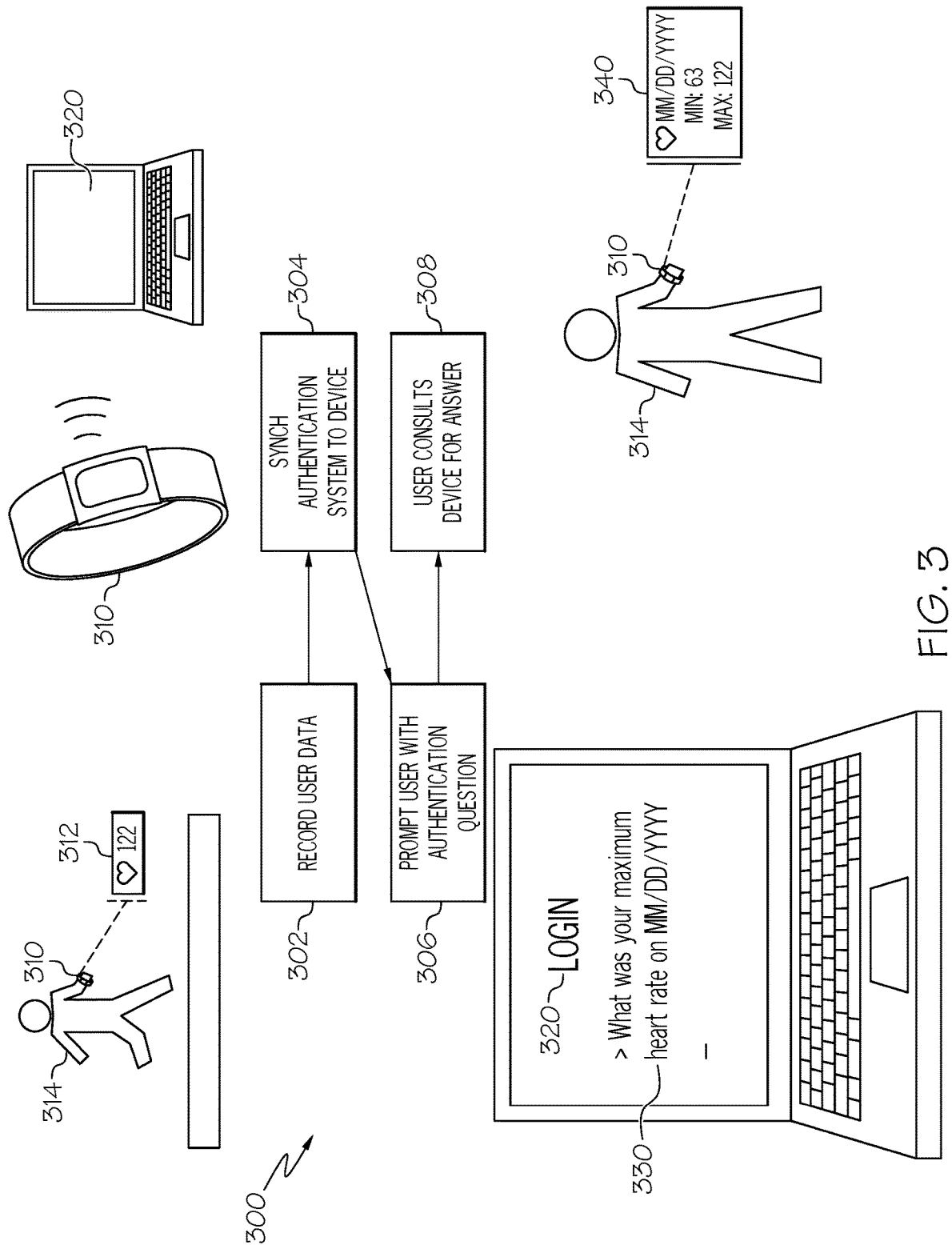
FIG. 3 shows a high level challenge-response authentication diagram according to illustrative embodiments.
Figure 4:
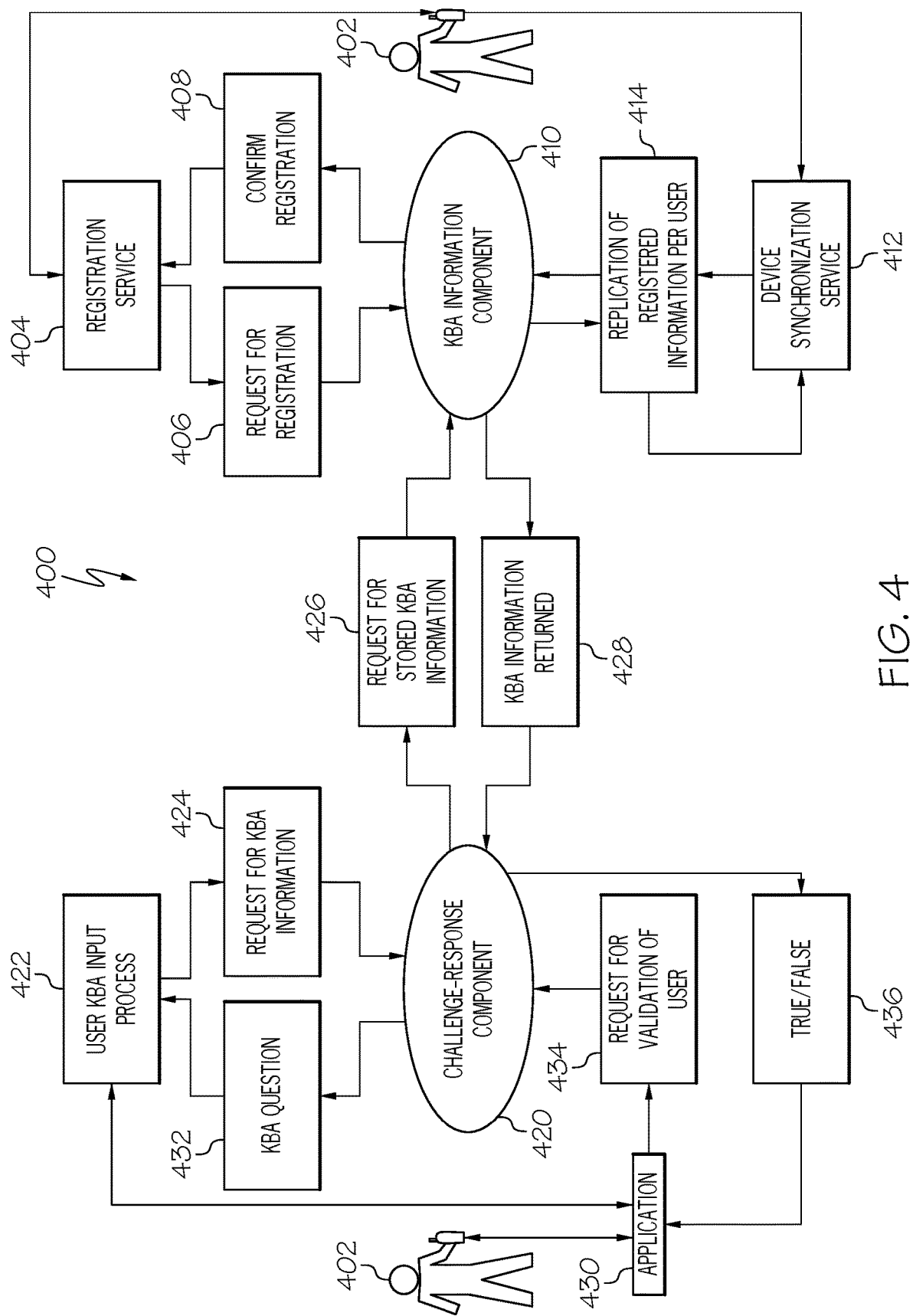
FIG. 4 shows a detailed challenge-response authentication tool according to illustrative embodiments.

Referring now to FIG. 3 in conjunction with FIG. 2, a high level challenge-response authentication diagram 300 according to illustrative embodiments is shown. In one embodiment, at 302, personal IoT device set 52 comprising at least one device 310 records data/information 312 associated with a user 314. For example, during a time period, user 314 may exercise and device 310 may record data 312 about user 314 comprising a heartrate at 122 bmp. At 304, a computerized authentication system 320 is synchronized with device(s) 310 of personal IoT device set 52. As discussed with reference to FIG. 1, this synchronizing may be over any type of network and/or network addressable connection. Computerized authentication system 320 may reside on or be embodied in, for example, computer system/server 12 comprising challenge-response authentication tool 400 (FIGS. 2 and 4). At 306, computerized authentication system 320 prompts user 314 with an authentication question 330 based on data/information 312 gathered by device(s) 310 of the personal IoT device set 52. For example, computerized authentication system 320 may ask user 314 for a maximum heart rate on a particular MM/DD/YYYY, where the MM/DD/YYYY may be any date. At 308, user 314 consults device(s) 310 of the personal IoT device set 52 for an answer 340 to authentication question 330. For example, user 314 may review data logs of device 310 to retrieve heartrate data from a particular MM/DD/YYYY, such as a heartrate log reciting a minimum heartrate of 63 bpm and a maximum heartrate of 122 bpm on the particular MM/DD/YYYY. User 314 may identify the maximum heartrate reading of 122 bpm as answer 340 to authentication question 330. User 314 may then enter answer 340 to the prompt of authentication question 330. It should be understood that these steps are intended as only a high level overview of one embodiment of the invention and are not intended to be limiting. Many embodiments and variations are envisioned, as are further discussed below.

Referring now to FIG. 4 in conjunction with FIG. 2, a detailed challenge-response authentication diagram for an enhanced challenge-response authentication tool 400 according to illustrative embodiments is shown. Enhanced challenge-response authentication tool 400 makes use of a version of Knowledge-Based Authentication (KBA) that relies on dynamically (i.e., updating from time to time) changing "trivial" information generated by personal IoT device set 52, such that embodiments of the system may base authentication on information generated by a user who is typically tracked by one or more devices (i.e., personal IoT device set 52) at his/her disposal (e.g. a Fitbit-like device). This generated information need not be readily known to the user, but is usually easily retrievable only by a genuine user, and accordingly is useful for authentication.

In one embodiment, an end user 402 requests a registration service 404 of a device 54A-N with a Knowledge Based Authentication (KBA) Information Component 410 at request 406 for service registration (e.g., through a user interface). Registration service 404 may be linked to Knowledge Based Authentication (KBA) Information Component 410. In one embodiment, registration services may be contracted (i.e., by a service provider), to register a device, transfer data from a device, store device data, and the like. A confirmation 408 may be received at a device 54A-N by user 402. A device 54A-N of user 402 may be given a unique identifier to assist in identifying the device 54A-N. User 402 may register one or more devices 54A-N of a personal IoT device set 52, but need not register all devices 54A-N associated with user 402. Furthermore, user 402 may configure a registered device 54A-N to share only certain data about user 402 (e.g., sleep quality, but not sleep duration).

In another embodiment, KBA Information Component 410 may be further linked to a wearable or device synchronization service 412. Wearable or device synchronization service 412 may be configured to receive, for example, personal metric data about a user via a push or pull synchronization. This synchronizing may be over any type of network and/or network addressable connection, including a PAN, WSAN, WLAN, WAN, and/or the like. In some embodiments, device 54A-N of user 402 may be configured to synchronize with KBA Information Component 410 when in close proximity to a device of KBA Information Component 410 (e.g., via a Bluetooth protocol). In still further embodiments, device 54A-N of user 402 may be configured to synchronize with KBA Information Component 410 via a wired connection (e.g., via a USB connection). In any case, registered user data may be replicated at 414 and inputted into KBA Information Component 410.

A user 402 may access a Challenge-Response Component 420 by initializing a request for an account, a system, a device, or other information protected by a user authentication system. At 422, an end user 402 initiates a user KBA input process to begin user authentication. In some embodiments, the authentication process may be initiated by application 430 stored in memory on a device of user 402. In other non-limiting embodiments, the authentication may be initiated by, for example, an application hosted at a remotely located website, or the like. A request for KBA information via Challenge Response Component 420 is sent at 424. At 426, Challenge-Response Component 420 requests stored knowledge based authentication information from KBA Information Component 410. At 428, the requested stored knowledge based authentication information is retrieved from KBA Information Component 410 and returned to Challenge-Response Component 420. KBA Information Component 410 and Challenge-Response Component 420 may communicate any way presently known or later discovered, for example, via IBM Worklight Application to Application Authentication mechanism for HTML 5 (IBM Worklight is a registered trademark of IBM Corporation). KBA Information Component 410 and Challenge-Response Component 420 may furthermore in some embodiments share system hardware or be distinct systems.

Although a device 54A-N of user 402, KBA Information Component 410, and Challenge-Response Component 420 are described separately herein, in some embodiments a device 54A-N of user 402 may include one or both of KBA Information Component 410 and Challenge-Response Component 420. In some other embodiments, KBA Information Component 410 and Challenge-Response Component 420 may be embodied in a shared component or comprise overlapping functionality. In still other embodiments, a device 54A-N of user 402, KBA Information Component 410, and Challenge-Response Component 420 may be separate systems.

Challenge-Response Component 420 may pose a question 432 to user 402 based on the returned KBA information. As discussed above with reference to FIGS. 2 and 3, User 402 consults a device 54A-N containing the KBA information and submits an answer to question 432 along with a request to validate 434 the user 402. Challenge-Response Component 420 determines if the submitted answer is correct and if correct (true), validates user 402 at 436. If the answer is not correct (false), Challenge-Response Component 420 does not validate user 402 at 436.

In some embodiments, after a failed authentication, user 402 may be locked from a system for an interval of time. In other embodiments, user 402 may be granted one or more chances or strikes before being locked out of a system. For example, if a user cannot find an answer to a first KBA question 432, Challenge-Response Component 420 may prompt user 402 with a second or even third KBA question before locking user 402 out of a system requiring authentication.

An answer by user 402 to question 432 may take a variety of forms. For example, in some embodiments, Challenge-Response Component 420 may request an answer in a specified format (e.g., "A: 02/17/15"), while in other embodiments Challenge-Response Component 420 may accept an answer in a spoken or written natural language format (e.g., "A: February seventeenth, twenty-fifteen") and interpret whether the answer is correct based on accepted natural language parameters.

Furthermore, in some embodiments, a confidence "C" of a user authentication may be increased by an analysis of personal IoT device set 52 associated with user 402. For example, when user 402 requests service registration 404, user 402 may select a service corresponding to readings "R" of a Fitbit-like device that monitors personal metrics of user 402, such as steps walked, quality of sleep, altimeter readings (e.g., in reference to floors in a building), etc. A history of these personal metrics may be recorded and/or stored by KBA Information Component 410. During an authentication, the value of C may be increased if R is within a threshold of expected values for the user. However, if R varies from a historical R (e.g., outside of a predetermined threshold), C may be decreased. For example, if user 402 typically takes about X steps in a day and attempts authentication on a day the user has taken about X steps, the value of C associated with the authentication will be increased. However, if a device 54A-N of user 402 shows a reading of 10× steps when a purported user attempts authentication, the value of C associated with the authentication will be decreased, and the purported user 402 will be suspected of being an imposter. If the purported user 402 is suspected of being an imposter (e.g., the user's R values have changed significantly) an additional challenge question might be asked, for example, based on a different device or using a traditional password.

In another embodiment, user 402 may inform Challenge-Response Component 420 which devices 54A-N user 402 has available to him/herself when initiating KBA input process to begin user authentication at 422. This allows Challenge-Response Component 420 to request only KBA information stored on those devices 54A-N, or to formulate questions based on information stored on those devices 54A-N. In some embodiments, user 402 may also create a default list of devices 54A-N generally available to him/herself (e.g., when registering devices 54A-N). In some embodiments user 402 may modify this list when initiating a KBA by informing Challenge-Response Component 420 what devices 54A-N user 402 does not have available (e.g., unchecking a house thermostat system if away from home) or what devices 54A-N user 402 does have available (e.g., checking a fitness device if out for a jog).

In still further embodiments, Challenge-Response Component 420 may automatically select one of a plurality of devices 54A-N (if user 402 has more than one device 54A-N) available to user 402 from which to base KBA question 432. This automatic selection may be based on any one or more of: a human factor, an ease of access, information on a device, security, a recentness of data, and/or a random choice. Human factors may include, but are not limited to: a preference user 402 may show for a particular device 54A-N, a current possession user 402 may have of a particular device 54A-N, a location of user 402, etc. An ease of access may include, but is not limited to, which devices 54A-N are available, or in proximity to user 402 who has initiated a KBA process. Information on device 54A-N may include, but is not limited to, a device selection based on the type/kind or specific information said device 54A-N recorded and/or stored for user 402. Security may include, but is not limited to, an encryption of data on device 54A-N, a password/code protecting data on a device, or a risk or danger associated with sharing data on a device. A recentness of data may include, but is not limited to, a selection of device 54A-N based on a recentness of new data being added to device 54A-N (e.g., within the past day, or week, or month). Events associated with this data are likely to be fresh in the mind of user 402 and relatively easy to find on device 54A-N of user 402. A random choice may include, but is not limited to, selecting device 54A-N at random. For example, if user 402 is out for a walk while wearing a Fitbit device 54B and attempts to log on to a website through a smartphone, Challenge-Response Component 420 may select the Fitbit device 54B from which to base KBA question 432 because the Fitbit device 54B is readily available to user 402, user 402 has shown a preference for the Fitbit device 54B, and/or there is recent data on the Fitbit device 54B.

Enhanced challenge-response authentication tool 400 may be further embodied as a trans-vendor service. For example, enhanced challenge-response authentication tool 400 may be provided as a service to facilitate functionality between different vendors who provide different products or devices 54A-N of personal IoT device set 52 used by user 402. Such a service would allow devices 54A-N from multiple vendors used by user 402 to be used in the same KBA system.

In some embodiments, the authentication process described in FIGS. 3 and 4 may be used for any of: a primary password entry (e.g., a user login at a website, a device login), a supplementary password (e.g., to augment and/or increase the security of a traditional password), a challenge question when a user has forgotten a password, or an unusual activity password (e.g., if user 402 is requesting access to somewhere (s)he does not usually go). The authentication process described in embodiments of the present invention may also be employed in situations in which it may be difficult for user 402 to type a traditional password (e.g., when operating a mobile device without a keyboard). In such a case, voice input may be used to respond to a KBA query.

Numerous forms of trivial dynamic information may be employed in a KBA context. For example, user 402 may be asked:

"How many steps did you take on Jul. 1, 2014?", which may be tracked by a "movement" application running on the user's cellphone and/or wrist watch.

"Who is the person in the picture taken on Jun. 22, 2014 at 9 PM?", which may be taken and saved by a camera of a smartphone or other device. Using photo-recognition (or photo tagging), KBA Information Component 410 may be configured to recognize this person and verify an answer of the user.

"What did you have for breakfast yesterday?" or "When did you wake up on Jan. 14, 2014?", which may be tracked by a "fitness" application running on the user's cellphone, wrist watch, Fitbit-like device, etc.

"How many eggs are in your refrigerator?", which may be tracked by a grocery application on a device linked to a smart fridge.

"How far/long did you run on Jun. 16, 2011?" or "How many calories did you burn on Feb. 17, 2015?" which may be tracked by an exercise wearable.

"Where did you go after work Wednesday?" or "What route did you take home Sunday?" which may be tracked by a GPS enabled device, a car computer system, etc.

"What was the last website you visited on this device?" or "Who is the last person you sent a text message to?"

"What TV channel/movie are you watching?", which may be tracked by a smart TV device.

"What is the current temperature in your house?" or "How many times did the garage door open yesterday?", which may be tracked by a smart home computer system.

In some embodiments, once a KBA question has been asked, the relevant information may be marked as used and obsolete. This would prevent the information from being reused again and stolen by a potential attacker.

In general, a plurality of on-time use KBA questions permits a user to avoid using a traditional password. However, in some embodiments, a traditional stock password may be reserved for use in the case that a new KBA question cannot currently be created, such as if Challenge-Response Component 420 or KBA Information Component 410 are unavailable, or if no new information has been synchronized to KBA Information Component 410.

Figure 5:
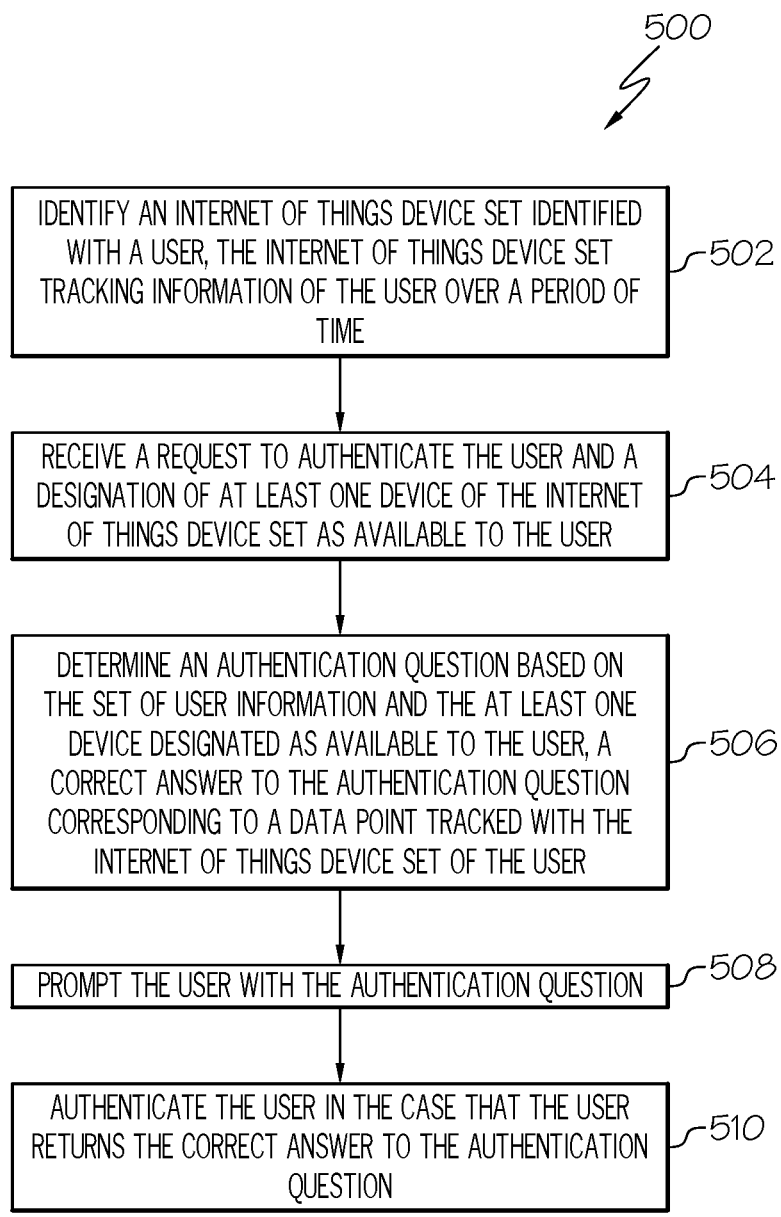
FIG. 5 shows a process flowchart for authenticating a user according to illustrative embodiments.

As depicted in FIG. 5 in conjunction with FIG. 3, a system (e.g., computer system 12) carries out the methodologies disclosed herein. Shown is a process flowchart 500 for authenticating a user 56. At step 502, an internet of things device set 52 identified with a user 56 is identified, the internet of things device set 52 tracking information of the user 56 over a period of time. At step 504, a request to authenticate the user 56 and a designation of at least one device of the internet of things device set 52 as available to the user 56 is received. At step 506, an authentication question is determined based on the information of the user and the at least one device designated as available to the user 56, a correct answer to the authentication question corresponding to a data point tracked with the internet of things device set 52 of user 56. At step 508, the user 56 is prompted with the authentication question. At step 510, the user 56 is authenticated in the case that the user 56 returns a correct answer to the authentication question.

Process flowchart 500 of FIG. 5 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for authenticating a user. Thus, embodiments herein disclose a process for supporting computer infrastructure, comprising integrating, hosting, maintaining, and deploying computer-readable code into a computing system (e.g., computer system 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for authenticating a user. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided herein approaches to authenticating a user. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A computer-implemented method for authenticating a user, the method comprising:
    identifying a plurality of internet of things devices associated with a user that each dynamically track and store on-device data points of the user over a period of time;
    receiving a request initiated by a party claiming to be the user to authenticate the party as the user and a designation from the requesting party of at least one device of the plurality of internet of things devices as currently accessible to the requesting party, the designated at least one device being configured to permit the requesting party to review a data log on the device to find a previous data point;
    generating an authentication question in a natural language, the answer to which is a data point selected from dynamically tracked data points of the user on the at least one device designated as accessible to the requesting party, wherein the selected data point is discoverable to the requesting party by viewing dynamically tracked data points on a display of the designated device, and wherein a correct answer to the authentication question corresponds to the selected data point tracked with the designated internet of things device;
    prompting the requesting party to find the data point on the designated device by presenting the authentication question to the requesting party in a natural language, the data point being the answer to the authentication question; and
    authenticating the requesting party as the user in the case that the requesting party returns the correct answer to the authentication question.

2. The method of claim 1, wherein the data point tracked by the plurality of internet of things devices is a personal metric corresponding to the user.

3. The method of claim 1, wherein in the case that the requesting party returns an incorrect answer to the authentication question, the method further comprises:
    determining a second authentication question based on a data point of the user and a second device of the plurality of internet of things devices designated as accessible to the requesting party; and
    prompting the requesting party with the second authentication question.

4. The method of claim 1, further comprising:
    comparing a set of data points of the user to historical data points of the user tracked by the plurality of internet of things devices of the user; and
    lowering a confidence of a user authentication if the comparison is outside of a pre-determined threshold.

5. The method of claim 1, further comprising receiving a registration of a plurality of internet of things devices from the user, wherein the user designates a subset of the plurality of devices as currently accessible devices.

6. The method of claim 1, wherein the at least one device designated as accessible to the requesting party comprises a plurality of devices designated as accessible to the requesting party, the method further comprising selecting one of the designated as accessible devices on which to base the authentication question, the selecting being based on at least one of: a human factor, an ease of access, data points on the device, security, a recentness of data, and a random selection.

7. The method of claim 1, wherein the authentication question is at least one of: a primary authentication, a supplementary authentication, a challenge authentication, and an unusual activity authentication.

8. A computer system for authenticating a user, the computer system comprising:
- a memory medium comprising program instructions;
- a bus coupled to the memory medium; and
- a processor, for executing the program instructions, coupled to a challenge-response authentication tool via the bus that when executing the program instructions causes the computer system to:
  - identify a plurality of internet of things devices associated with a user that each dynamically track and store on-device data points of the user over a period of time;
  - receive a request initiated by a party claiming to be the user to authenticate the party as the user and a designation from the requesting party of at least one device of the plurality of internet of things devices as currently accessible to the requesting party, the designated at least one device being configured to permit the requesting party to review a data log on the device to find a previous data point;
  - generate an authentication question in a natural language, the answer to which is a data point selected from dynamically tracked data points of the user on the at least one device designated as accessible to the requesting party, wherein the selected data point is discoverable to the requesting party by viewing dynamically tracked data points on a display of the designated device, and wherein a correct answer to the authentication question corresponds to the selected data point tracked with the designated internet of things device;
  - prompt the requesting party to find the data point on the designated device by presenting the authentication question to the requesting party in a natural language, the data point being the answer to the authentication question; and
  - authenticate the requesting party as the user in the case that the requesting party returns the correct answer to the authentication question.

9. The system of claim 8, wherein the data point tracked by the plurality of internet of things devices is a personal metric corresponding to the user.

10. The system of claim 8, wherein in the case that the requesting party returns an incorrect answer to the authentication question, the program instructions further cause the system to:
- determine a second authentication question based on a data point of the user and a second device of the plurality of internet of things devices designated as accessible to the requesting party; and
- prompt the requesting party with the second authentication question.

11. The system of claim 8, the program instructions further causing the system to:
- compare a set of data points of the user to historical data points of the user tracked by the plurality of internet of things devices of the user; and
- lower a confidence of a user authentication if the comparison is outside of a pre-determined threshold.

12. The system of claim 8, the program instructions further causing the system to receive a registration of a plurality of internet of things devices from the user, wherein the user designates a subset of the plurality of devices as currently accessible devices.

13. The system of claim 8, wherein the at least one device designated as accessible to the requesting party comprises a plurality of devices designated as accessible to the requesting party, the program instructions further causing the system to select one of the designated as accessible devices on which to base the authentication question, the selecting being based on at least one of: a human factor, an ease of access, data points on the device, security, a recentness of data, and a random selection.

14. The system of claim 8, wherein the authentication question is at least one of: a primary authentication, a supplementary authentication, a challenge authentication, and an unusual activity authentication.

15. A computer program product for authenticating a user, the computer program product comprising a computer readable storage memory, and program instructions stored on the computer readable storage memory, to: identify a plurality of internet of things devices associated with a user that each dynamically track and store on-device data points of the user over a period of time; receive a request initiated by a party claiming to be the user to authenticate the party as the user and a designation from the requesting party of at least one device of the plurality of internet of things devices as currently accessible to the requesting party, the designated at least one device being configured to permit the requesting party to review a data log on the device to find a previous data point; generate an authentication question in a natural language, the answer to which is a data point selected from dynamically tracked data points of the user on the at least one device designated as accessible to the requesting party, wherein the selected data point is discoverable to the requesting party by viewing dynamically tracked data points on a display of the designated device, and wherein a correct answer to the authentication question corresponds to the selected data point tracked with the designated internet of things device; prompt the requesting party to find the data point on the designated device by presenting the authentication question to the requesting party in a natural language, the data point being the answer to the authentication question; and authenticate the requesting party as the user in the case that the requesting party returns the correct answer to the authentication question.

16. The computer program product of claim 15, wherein the data point tracked by the plurality of internet of things devices is a personal metric corresponding to the user.

17. The computer program product of claim 15, wherein the case that the requesting party returns an incorrect answer to the authentication question, the program instructions are further configured to:
- determine a second authentication question based on a data point of the user and a second device of the plurality of internet of things devices designated as accessible to the requesting party; and
- prompt the requesting party with the second authentication question.

18. The computer program product of claim 15, the program instructions further being configured to:
- compare a set of data points of the user to historical data points of the user tracked by the plurality of internet of things devices of the user; and
- lower a confidence of a user authentication if the comparison is outside of a pre-determined threshold.

19. The computer program product of claim 15, the program instructions further being configured to receive a registration of a plurality of internet of things devices from the user, wherein the user designates a subset of the plurality of devices as currently accessible devices.

20. The computer program product of claim 15, wherein the at least one device designated as accessible to the requesting party comprises a plurality of devices designated as accessible to the requesting party, the program instructions further being configured to select one of the designated as accessible devices on which to base the authentication question, the selecting being based on at least one of: a human factor, an ease of access, data points on the device, security, a recentness of data, and a random selection, wherein the authentication question is at least one of: a primary authentication, a supplementary authentication, a challenge authentication, and an unusual activity authentication.

\* \* \* \* \*